United States Patent
Roose et al.

(10) Patent No.: US 11,885,365 B1
(45) Date of Patent: Jan. 30, 2024

(54) RIVET NUT

(71) Applicant: Arkansas Bolt Co., Inc., Little Rock, AR (US)

(72) Inventors: Jeffrey T. Roose, Troy, MI (US); Harry Lee Hastings, III, Little Rock, AR (US)

( * ) Notice: Subject to any disclaimer, the term of this patent is extended or adjusted under 35 U.S.C. 154(b) by 0 days.

(21) Appl. No.: 18/202,744

(22) Filed: May 26, 2023

(51) Int. Cl.
*F16B 37/06* (2006.01)
*F16B 5/04* (2006.01)

(52) U.S. Cl.
CPC .............. *F16B 37/067* (2013.01); *F16B 5/04* (2013.01); *F16B 37/06* (2013.01)

(58) Field of Classification Search
CPC ........ F16B 5/04; F16B 37/041; F16B 37/044; F16B 37/045; F16B 37/06; F16B 37/067; Y10S 411/968
USPC ........ 411/172–174, 178, 183, 184, 185, 501, 411/508–509
See application file for complete search history.

(56) References Cited

U.S. PATENT DOCUMENTS

| | | | |
|---|---|---|---|
| 3,369,442 A * | 2/1968 | Darby | F16B 19/1063 411/34 |
| 4,321,814 A | 3/1982 | Martin | |
| 5,403,135 A | 4/1995 | Renner et al. | |
| 6,102,265 A | 8/2000 | Stapleton | |
| 7,216,520 B1 | 5/2007 | Villanueva | |
| 7,226,263 B2 * | 6/2007 | Schwarzbich | F16B 5/0233 411/546 |
| 7,857,563 B2 | 12/2010 | Pratt | |
| 8,226,339 B2 * | 7/2012 | Neri | F16B 37/067 411/181 |
| 8,936,422 B2 * | 1/2015 | Makino | F16B 37/067 411/34 |
| 9,028,185 B2 | 5/2015 | Eggers et al. | |
| 9,651,080 B2 | 5/2017 | Eggers et al. | |
| 9,897,125 B2 | 2/2018 | Blaski et al. | |
| 11,092,184 B2 | 8/2021 | Blaski et al. | |
| 2004/0179920 A1 * | 9/2004 | Ando | F16B 33/006 411/501 |
| 2004/0247412 A1 | 12/2004 | Reck et al. | |
| 2007/0243035 A1 | 10/2007 | Pratt | |
| 2011/0311334 A1 * | 12/2011 | Makino | F16B 37/067 148/225 |
| 2017/0335876 A1 | 11/2017 | Blaski et al. | |
| 2019/0154073 A1 * | 5/2019 | Figge | F16B 5/0258 |
| 2020/0096032 A1 | 3/2020 | Blaski et al. | |
| 2020/0194755 A1 | 6/2020 | Maryanski et al. | |

FOREIGN PATENT DOCUMENTS

CN  102829056  9/2012

* cited by examiner

*Primary Examiner* — Roberta S Delisle
(74) *Attorney, Agent, or Firm* — Joe D. Calhoun

(57) ABSTRACT

An apparatus providing mating alignment between internal threading of a rivet nut and the external threading of the mandrel of an unclaimed installation tool before anchoring the rivet nut in a hole in a substrate, or the external threading of an unclaimed threaded fastener after anchoring in the substrate hole. The improvements include a bushing sleeve seated in a counterbore in the rivet nut, for guiding the external threading of the mandrel or fastener to the internal threading of the rivet nut. The sleeve also enables play during upset of the rivet nut, and provides visual confirmation whether the rivet nut has been properly anchored in the hole of substrate.

30 Claims, 11 Drawing Sheets

RIVET NUT

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to fastener systems and apparati. More particularly, the invention disclosed herein relates to rivet nuts and associated fasteners often used to fasten or bind together panels or other substrates. More particularly, the invention disclosed herein involves an improved rivet nut accepting a bushing/sleeve apparatus functioning to enable proper upset of the rivet nut during installation and guiding the fastener (typically a screw or bolt) into mating alignment with the rivet nut (typically its internal threads).

(2) BACKGROUND OF THE INVENTION

Citation or identification of any reference in this application shall not be construed as an admission that such reference is material as prior art to the present disclosure. The following references disclose rivet nuts and improvements thereto.

U.S. Pat. No. 11,092,184 issued to Blaski discloses a rivet nut installation method and a rivet nut structural configuration that essentially makes the rivet nut "self-tapping". After the rivet nut is rotatably mounted onto an externally threaded mandrel of an installation tool, the mandrel is rotated together with the rivet nut while the leading end of the mandrel that protrudes beyond the leading end of the rivet nut is in contact with the outwardly facing side of the workpiece at the installation location. The leading end of the mandrel is driven into and through the workpiece in an insertion direction while continuing to rotate the mandrel until a hole is formed through the workpiece and the head of the rivet nut engages the outer side of the workpiece. The mandrel is retracted in a reverse direction while the head of the rivet nut is held against the outer side of the workpiece to collapse the upper wall portion of the rivet nut into a radially outwardly extending bulge or bulb that bears on the opposite side of the workpiece. The head of the rivet nut and the radially outwardly extending bulb exert a compressive force against the outer and inner surfaces of the workpiece at the installation location. As best illustrated in FIG. 1, this patent discloses a counterbore cavity terminating in an annular ledge, but no sloping/converging wall and no bushing sleeve.

U.S. Pat. No. 5,403,135 issued to Renner discloses a rivet nut with a counterbore cavity having sides parallel to the axis of the internal threads of the lower portion of the rivet nut. A self-tapping cap screw functions as the pulling mandrel when the cap screw is connected to the setting tool. The cap screw is a self-tapping screw. As best illustrated in FIG. 1, this patent discloses a counterbore cavity terminating in an annular ledge, but no sloping/converging wall and no bushing sleeve.

U.S. Pat. No. 7,857,563 issued to Pratt discloses a blind bolt fastener having a core bolt-to-body mechanical lock, and a sleeve-to-body mechanical lock. The core bolt mechanically locks to an integrally formed fastener body and sleeve to prevent the core bolt from unscrewing. As best illustrated in FIG. 6, this patent does not disclose a counterbore cavity terminating in an annular ledge, but it discloses a region similar to a counterbore opening having an entry with a sloping/converging wall; but neither this patent nor any of the aforementioned patents discloses an apparatus providing mating alignment between internal threading of a rivet nut and the external threading of the mandrel of an unclaimed rivet nut installation tool before anchoring the rivet nut in a hole in a substrate, and the external threading of an unclaimed threaded fastener after anchoring in the substrate hole.

None of the known patents discloses an alignment apparatus comprising a bushing sleeve having a maximum outer diameter sized for snug insertion and retention in the counterbore cavity of the rivet nut and having an inner diameter sized to guide the external threading of the installation tool's mandrel (and/or the external threading of the fastener) into optimally aligned rotational mating with the internal threading of the rivet nut's mating chamber.

SUMMARY OF THE INVENTION

The invention disclosed herein is essentially an apparatus providing alignment between the interior threads of a rivet nut and either a rivet nut installation tool or an externally threaded fastener for mating with the rivet nut. More particularly, the invention comprises (includes):
  (a) a rivet nut (10) including a counterbore opening and counterbore cavity (1) leading to an internally threaded shank end (2) having an internal diameter smaller than the counterbore opening, preferably the counterbore cavity having an internal diameter converging from the counterbore opening to an annular seating ledge (16) terminating the counterbore cavity; and
  (b) an essentially cylindrical resilient and durable sleeve (20) configured for snug press-fitting seating within the counterbore cavity with its leading end (22) adjacent the annular seating ledge, and having a length resulting in the trailing edge (23) situated substantially flush with the counterbore opening if the rivet nut has been properly installed, the sleeve having an internal diameter slightly larger than the outer diameter of the installation mandrel threads of the rivet nut installation tool or of the externally threaded fastener for alignment with the internal threads of the shank.

In general, the invention disclosed herein includes (comprises) an improved rivet nut including a bushing sleeve to align the threading of an incoming screw (or installation tool) with the threading defining a mating chamber in the rivet nut. One primary improvement involves the inclusion of a properly seated bushing sleeve within the trailing portion of the rivet nut, to function as a guide for rotational mating of the externally threaded tip of a mandrel of an installation tool (or of a fastener) with the internal threads of the mating chamber of the rivet nut. The bushing sleeve also enhances control of the formation of the annular bulb formed by reverse axial pulling of the rivet nut during installation, which essentially pinches or clamps the substrate between the bulb and the underside of the head of the rivet nut. Increasing the number of threads of the mating chamber also enhances control of the reverse axial pulling. The improved rivet nut can be used in applications likely to encounter "over-upset" installation, which is applying reverse axial pulling greater than that typically prescribed for the particular application. Besides preventing improper installation of the rivet nut and preventing cross-threading during fastening, the improved rivet nut and bushing sleeve enable fastening with greater strength resulting in fewer fastening failures. They can also be engineered to provide enhanced fastening after intentionally induced over-upset installation that does not cause deformation of the bulb or other aspects of the rivet nut; and as a fail-safe to avoid stopping an assembly line after over-upset occurs accidentally during installation (typically due to mis-calibration of the installation tool), the rivet nut strength can result in breakage of the installation tool mandrel which can be readily remedied after the part has progressed out of the assembly line.

One primary benefit of the disclosed invention is that the sleeve assures alignment perpendicularity between both threadings, eliminating or reducing the possibility of cross-threading and the defects caused by cross-threading.

Another primary benefit is that the sleeve provides visual confirmation whether the rivet nut has been properly seated within the substrate hole.

Another primary benefit is that the improved rivet nut may readily provide a closed ended rivet nut that is waterproof or moisture resistant.

Another benefit is that the rivet nut improves the anchoring to the substrate by improved bulb characteristics and knurling and serrations.

Another benefit is that the rivet nut improves fastening strength by improved threading, and improved contact with both the substrate hole wall and the outer and inner surface surrounding the substrate hole.

Other benefits will become apparent from the review of the disclosure herein.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings.

Figure 1:
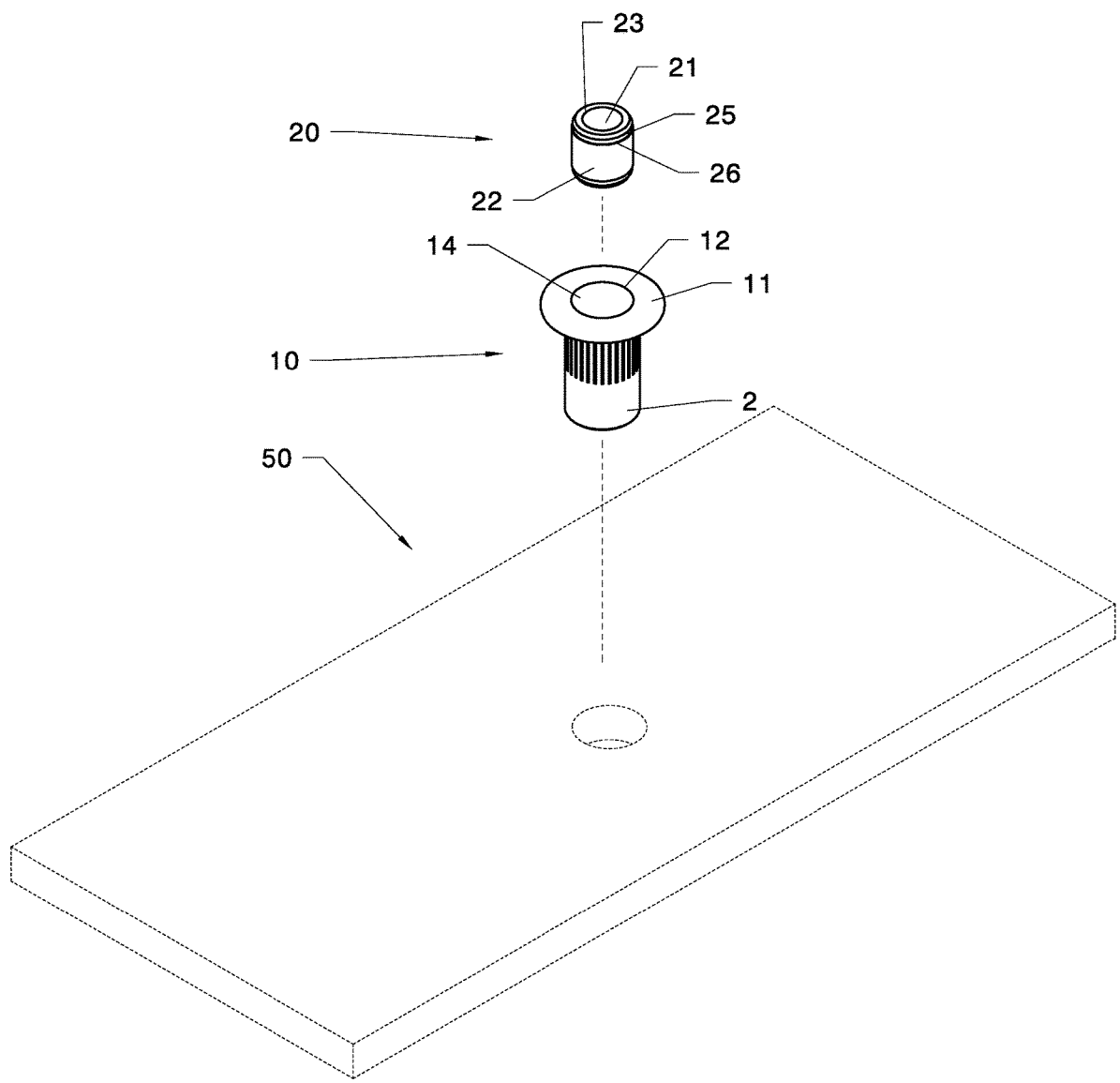
FIG. 1 is a perspective exploded view of a representative sample of the improved fastener apparatus of the present invention oriented for application to a horizontal substrate panel, including the improved rivet nut with the bushing sleeve poised for insertion therein.
Figure 2:
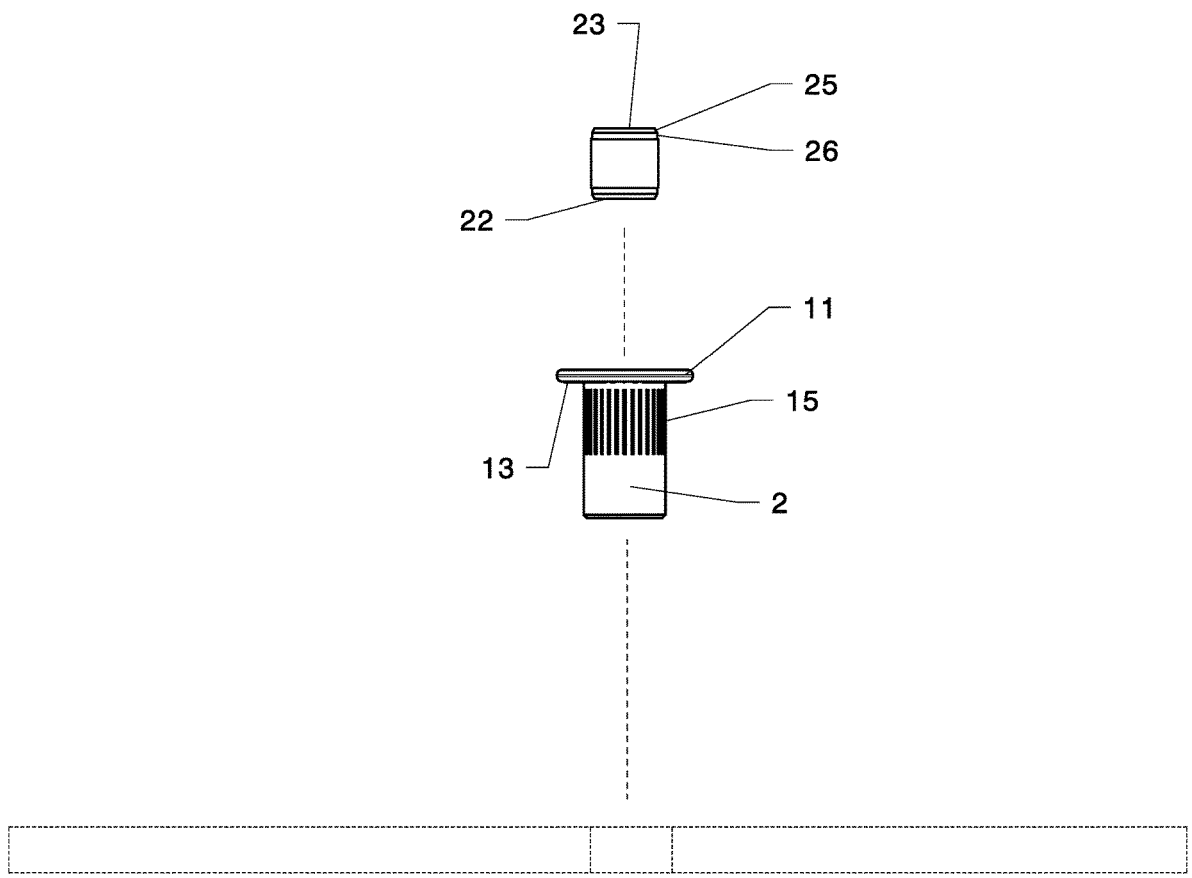
FIG. 2 is a side elevation view of the rivet nut and bushing sleeve of FIG. 1; due to the external symmetries of the rivet nut and the bushing sleeve, the side elevation views of both parts after rotation 90 degrees and 180 degrees are essentially the same.
Figure 3:
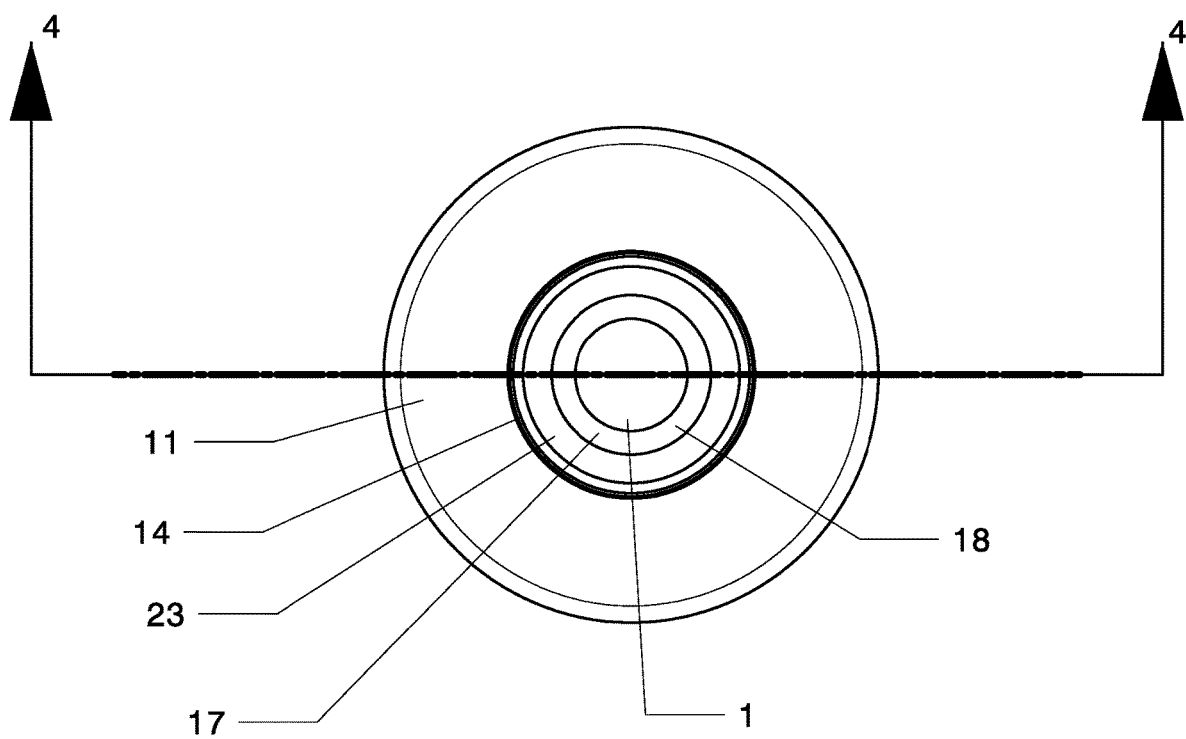
FIG. 3 is a top plan view of the rivet nut with the bushing sleeve fully inserted into the trailing end of the rivet nut, seated in the counterbore cavity against the annular seating ledge.
Figure 4:
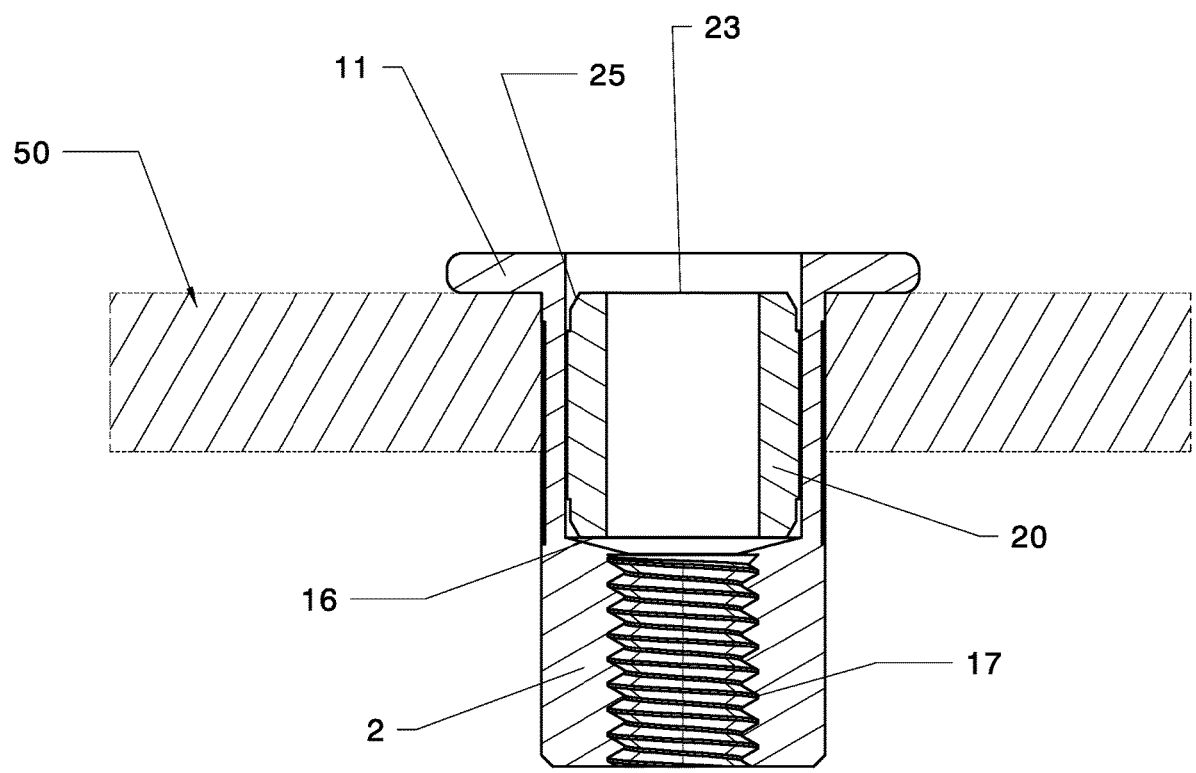
FIG. 4 is a cross section elevation view of the rivet nut and inserted bushing sleeve of FIG. 3 along plane 4-4 of FIG. 3, after the rivet nut has been inserted into a hole in the substrate panel depicted in broken lines.
Figure 5:
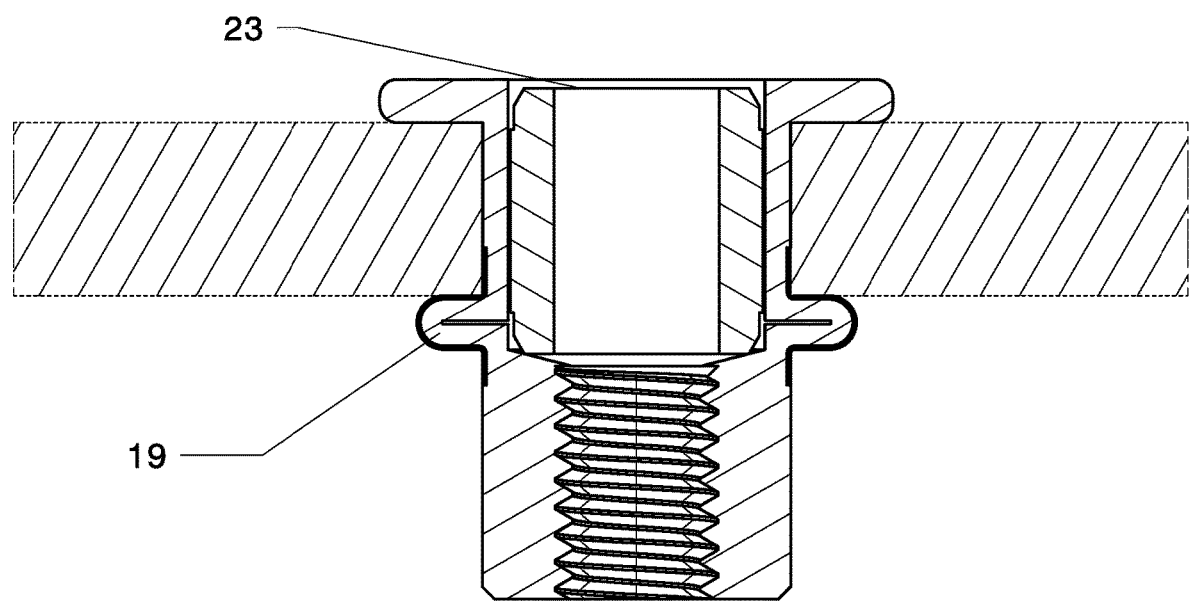
FIG. 5 is the same view as FIG. 4, after the rivet nut has been properly upset in the rivet nut panel installation process.
Figure 6:
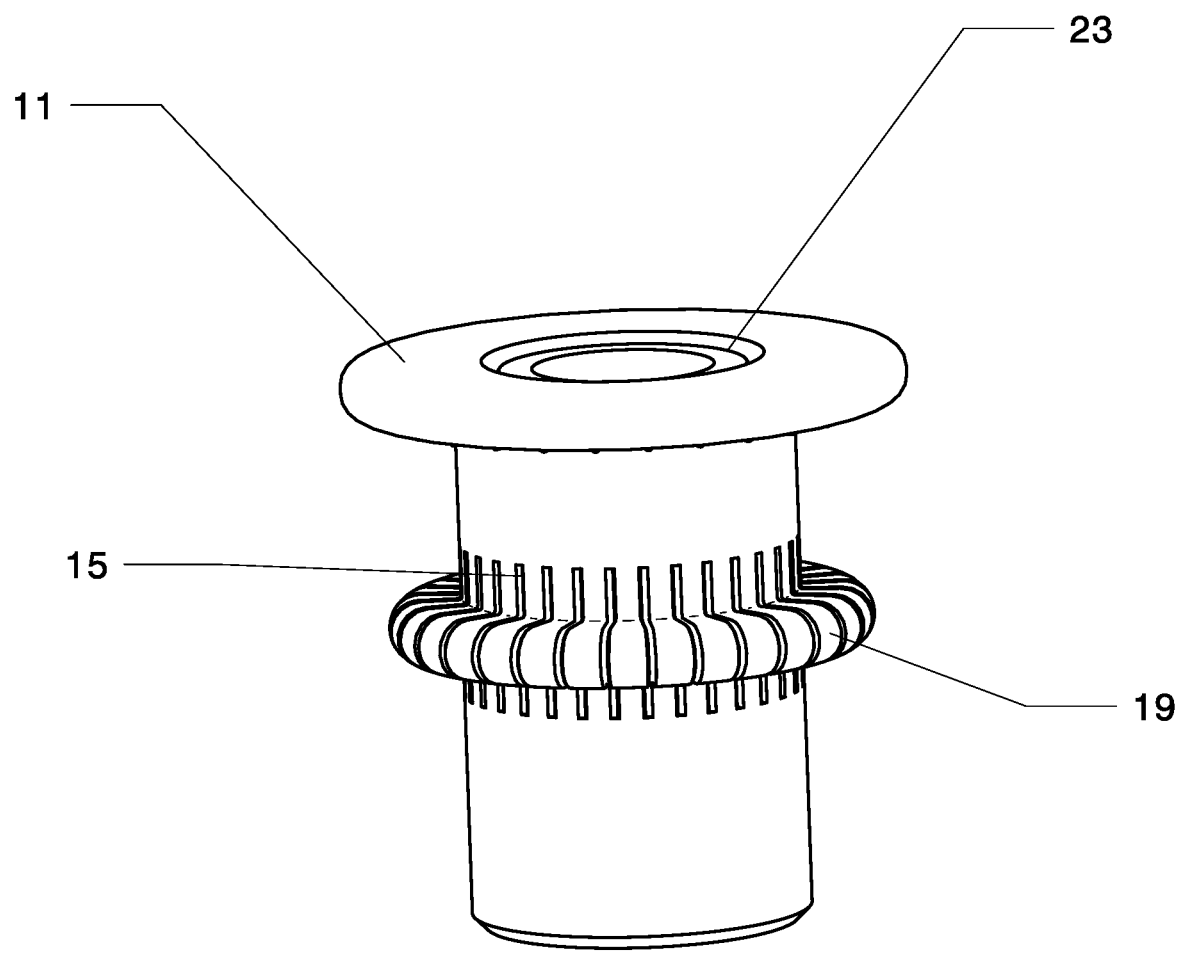
FIG. 6 is a perspective view of the rivet nut and bushing sleeve of FIG. 5.
Figure 7:
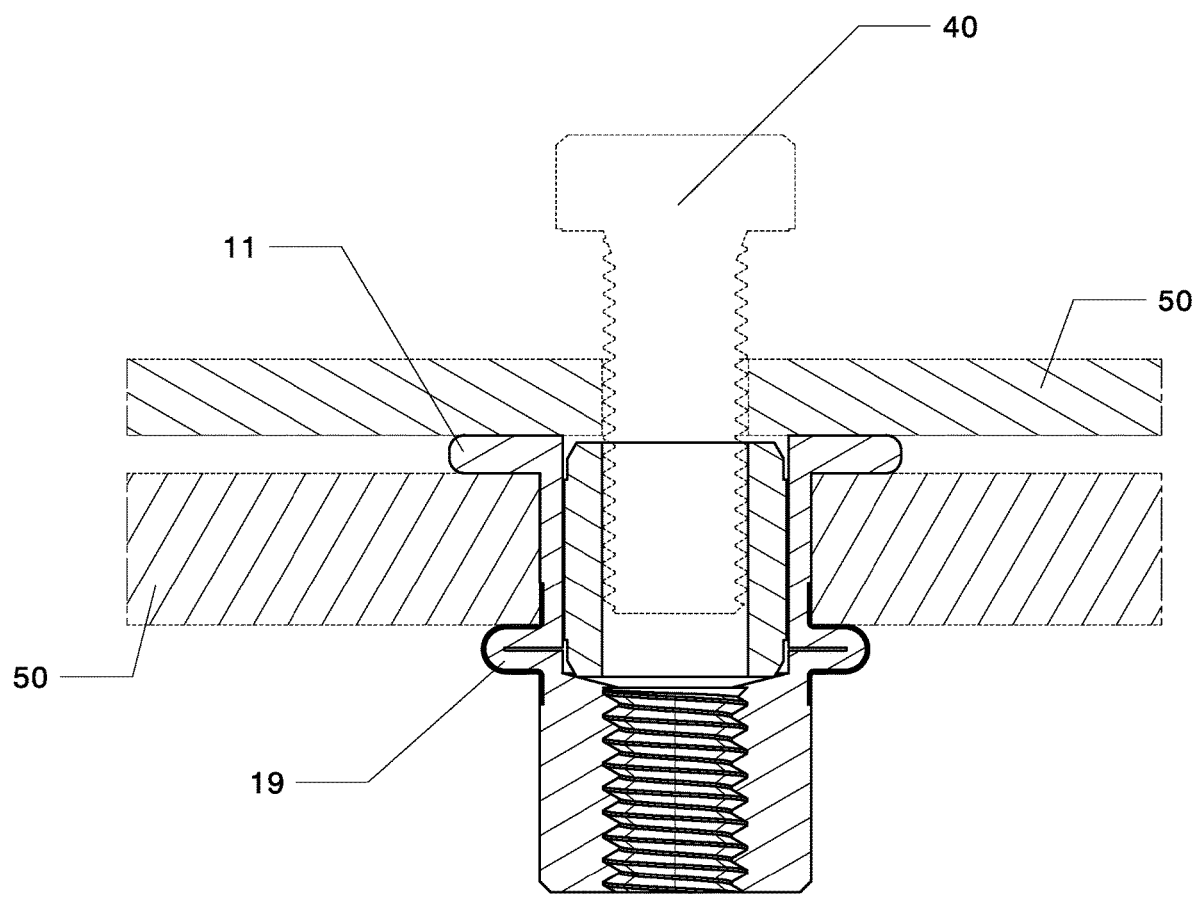
FIG. 7 is the same view as FIG. 5, after a second substrate panel (depicted in broken lines) has been layered atop the first substrate panel (and installed rivet nut), and the tip of a screw fastener inserted into the lumen of the bushing sleeve within the trailing portion of the rivet nut.
Figure 8:
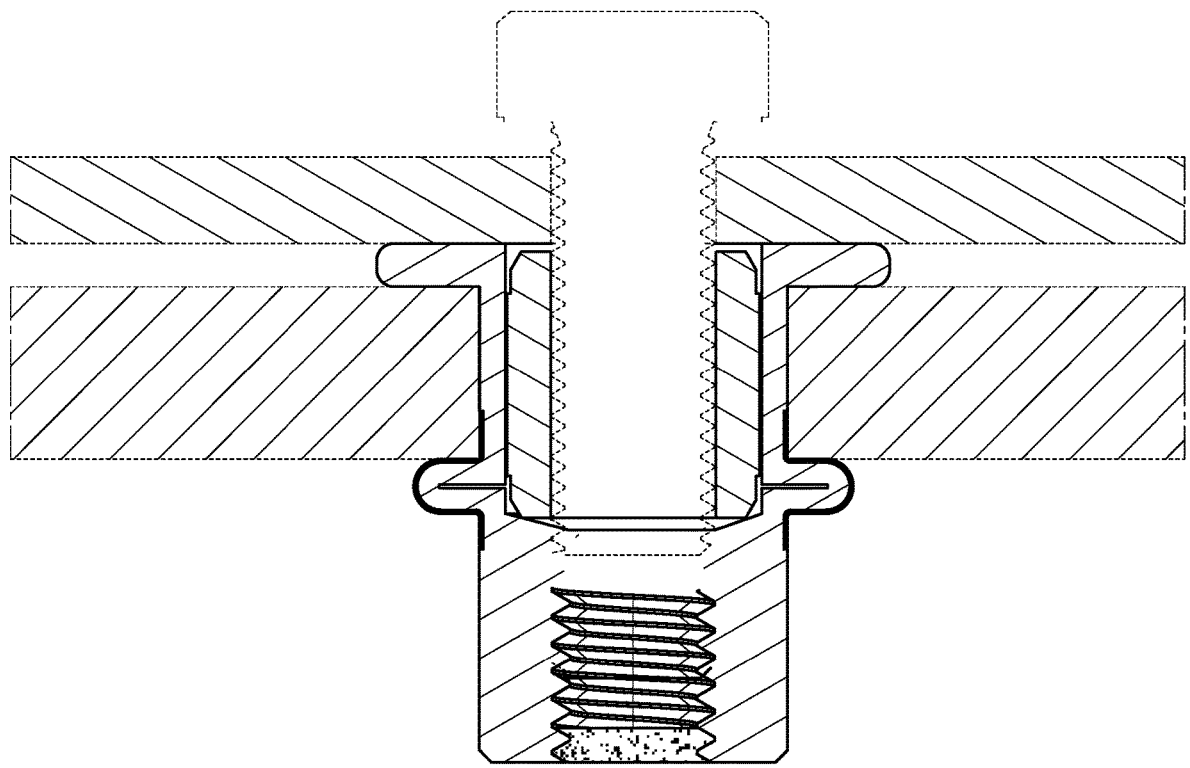
FIG. 8 is the same view as FIG. 7, after the screw fastener has been rotationally mated to the rivet nut mating chamber; a waterproof end plug is also included.
Figure 9:
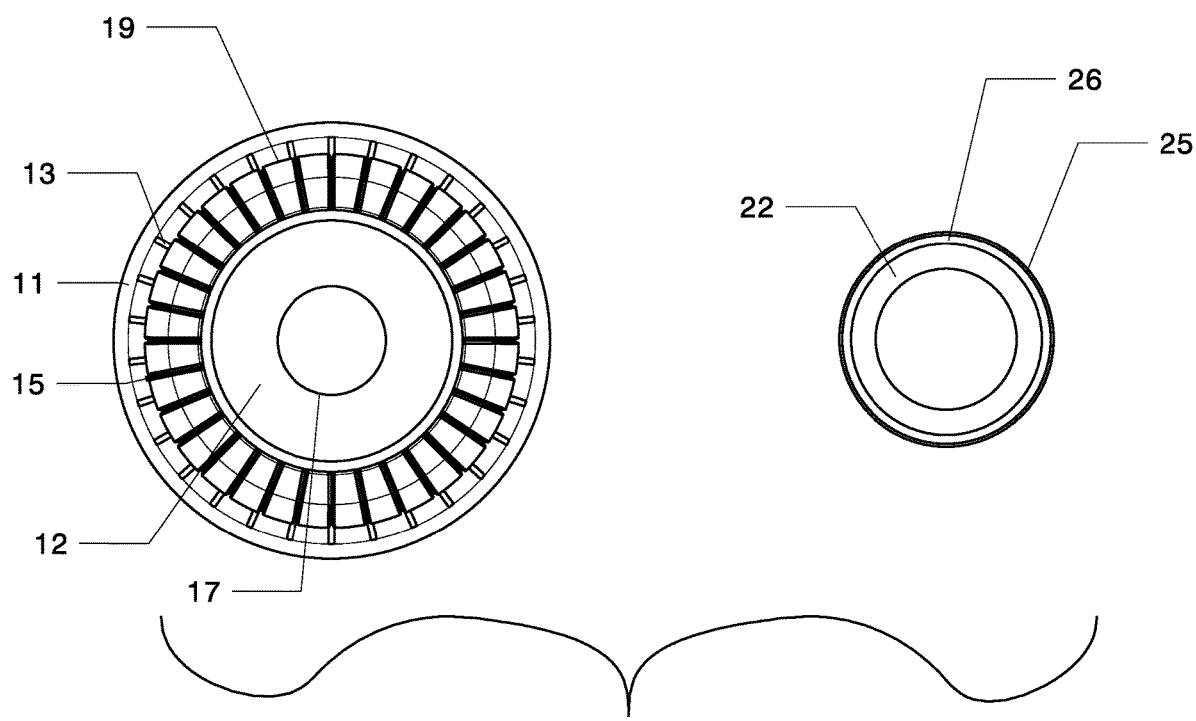
FIG. 9 is a bottom plan view of the upset rivet nut and the bushing sleeve, apart.
Figure 10:
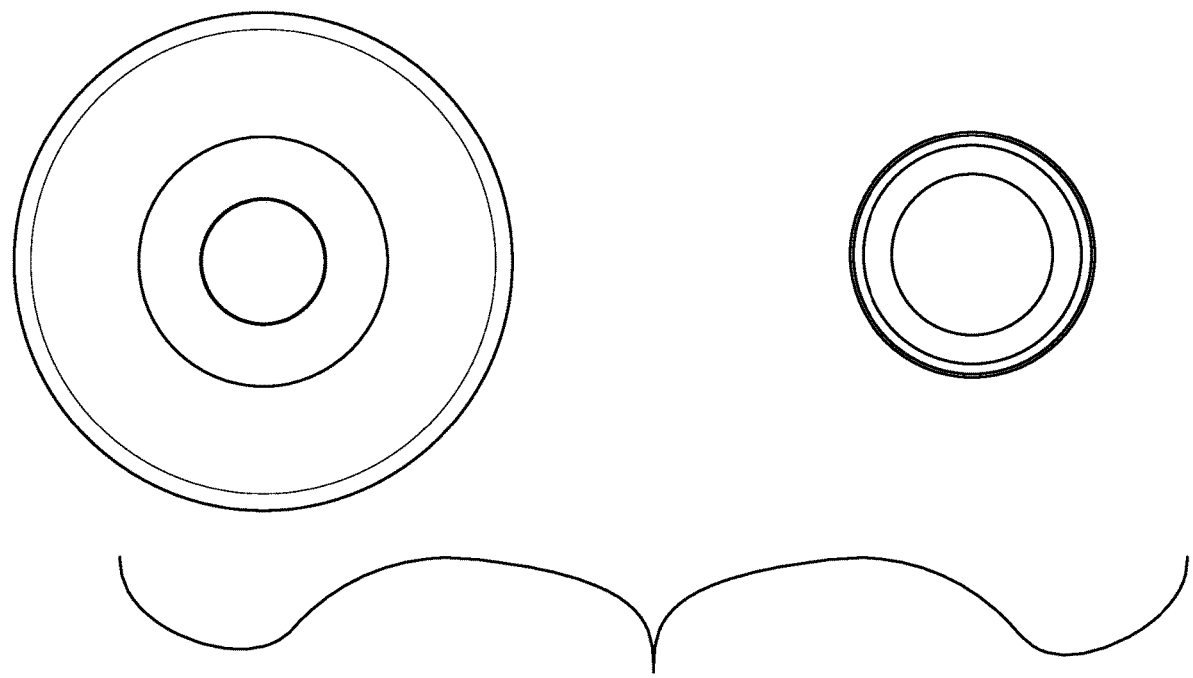
FIG. 10 is a top plan view of the upset rivet nut and bushing sleeve, apart, when the upset does not cause the bulb to extend outwardly past the diameter of the head of the rivet nut.
Figure 11:
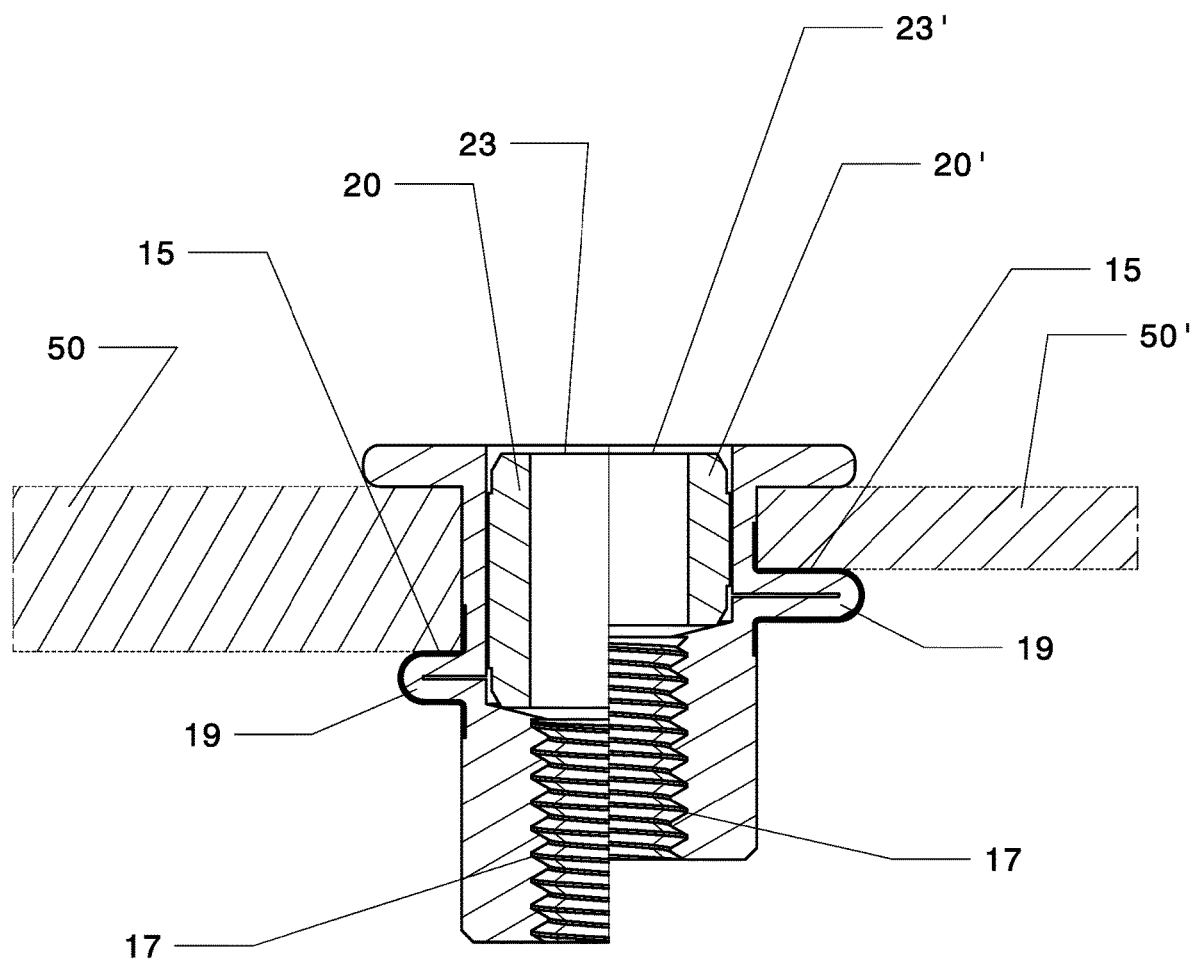
FIG. 11 is a cross section view of a side elevation view of an upset rivnut and inserted bushing sleeve, cross-sectioned at plane 4-4 of FIG. 3; this is a split view, with the left side depicting upset of the rivet nut with a longer bushing sleeve for a thicker panel, and with the right side depicting upset of the rivet nut with a shorter bushing sleeve for a thinner panel.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials to the extent that other materials satisfy the structural and/or functional requirements. For example, any material may be used for the bushing sleeve so long as it satisfies the seating and guiding requirements for which it is being used. In one embodiment, the bushing sleeve is constructed of glass filled nylon material; however, any material of sufficient rigidity and durability will suffice as well. Likewise, the disclosed invention is not limited by any construction process or method.

A device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any disclosed device, apparatus, system and/or method can consist of or consist essentially of (rather than comprise/include/have) any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb. Any method including multiple steps is not, but can be, limited to the order of the steps recited in the method.

The feature or features of one embodiment may be applied to or found in other embodiments, even though not described or illustrated, unless expressly prohibited by this disclosure or the nature of the embodiment or feature(s).

The term "substantially flush", in the context of the trailing edge of a seated bushing sleeve after upset of the rivet nut by reverse axial pulling, means that the trailing edge of the bushing sleeve is co-planar with (or slightly below) the counterbore cavity opening of the trailing portion of the rivet nut.

The term "mating chamber" means the internally threaded portion of the insertion end of the rivet nut.

The term "mating member" means either the external threads of the unclaimed mandrel of the unclaimed rivet nut installation tool or the external threads of the unclaimed externally threaded fastener with which the rivet nut was intended to form a fastening joint.

The term "screw" may include a bolt or any other externally threaded fastener, and the term "bolt" may include a screw or any other externally threaded fastener.

Each pairing of rivet nut performance needs and bushing sleeve performance needs may be either size specific (dependent upon the sizing of the fastener or rivet nut or substrate dimensions) or specially engineered for the performance demands of specific applications such as (for example) fastening metal or polymeric panels, plastics with glass fill, aluminum, steel or stainless steel. All thread sizes of the improved rivet nut may be manufactured to be compliant with the International Standards Organization's fastener property classifications, especially classes 8.8 (low carbon steel), 9.8 (medium carbon grade steel), 10.9 (high carbon grade steel and alloy) and 12.9 (high carbon stainless steel and titanium alloy). For example, the bushing sleeve length may be determined by the thickness of the substrate involved in the fastening plus the thickness of the rivet nut head, then reducing the length by a small amount (about 1 millimeter) to make the visible edge of the bushing sleeve be positioned just below the surface of the rivet nut head to signal when proper seating of the sleeve and upsetting of the rivet nut has occurred. Moreover, the matching of rivet nut and bushing sleeve pairings may be compatible for direct and indirect (or OEM or after-market) uses in particular industries or fields, such as automotive manufacturers and aerospace platform fastening joint applications, and for appliance and other general industry fastening joint applications. The improved rivet nut bushing sleeve apparatus can be engineered to enable the rivet nut to better satisfy the fastening joint requirements for the particular grade of material being used.

During installation, after the rivet nut (with the seated bushing sleeve) is rotationally mated to the mandrel of the installation tool, and inserted into the substrate hole, the installation tool applies reverse axial pulling force to the rivet nut, essentially collapsing the un-sleeved portion of the counterbore wall to form a bulb on the underside of the substrate; that is known as "upset" of the rivet nut. During such upset, the bushing sleeve reduces the lateral "play" of the rivet nut and installation tool, maintaining the alignment of the rivet nut to facilitate upset without cocking or other misalignment creating a defective bulb. After axial pull upset of the rivet nut, the inner diameter of the counterbore-seated bushing sleeve provides direct alignment for mating the respective externally threaded fastener with the internal threading of the mating chamber of the insertion portion of the rivet nut. The inner diameter of the sleeve is typically preferably about 0.0015 inch to about 0.0025 inch larger than outer diameter of the threaded fastener, although other ranges of differentials will suffice so long as the inner diameter of the sleeve is larger than the threaded fastener. The sleeve interacts with the seating ledge at the bottom of the counterbore to force screw-to-nut alignment with the threads of the mating chamber. The sleeve functions to reduce or eliminate so-called cross-threading, which is essentially misalignment of the threads preventing or damaging proper fastening. The sleeve greatly enhances achievement of the goal of providing rivet nuts which, after initial installation, consistently result in fastening having no defects, achieving the fastener industry goal of having zero defective parts per million. The sleeve greatly enhances the anti-crossthreading benefits experienced when using a screw or bolt having a header point, dog point or projectile point.

These rivet nut improvements have synergistically high utility for automotive and aircraft parts. For example, the bushing sleeve may be press fit quickly into the inner diameter of the rivet nut counterbore, with much more speed and accuracy verifiable by visual confirmation that the anchored rivet nut's sleeve is essentially flush with the top surface of the rivet nut, verifying that proper axial pull distance occurred during rivet nut (upset) installation. The bushing improved rivet nut with bushing sleeve also provides a more stable, ridged fastening joint when properly "upset" (installed) in the substrate hole. The improvements also provide resistance against vibration failures.

The deeper counterbore design (especially with counterbore wall angulation and bushing sleeve) enables production of a larger annular bulb upon upsetting (installation) to increase the fastening anchoring strength and stability. The length of the counterbore wall has been increased to provide increased surface area for the crimping for producing the annular bulb that pinches the substrate between the underside of the head (with serrations) and the upper side of the bulb (with knurling), and increased the surface area for the contact between the sidewall of the substrate hole and the adjacent knurling. The improved design has special utility for substrate materials including plastics (preferably but not necessarily with glass fill), PVC with 33% glass, nylon and glass fill, and for various grades of aluminum, steel and titanium.

The length of the bushing sleeve and its counterbore can be application specific to the substrate material and its thickness. The preferred lengths of the bushing sleeve and its counterbore primarily depend upon the needs (such a required strength) of the fastening joint and the composition of the substrate material. For example, if strong fastening is required in a location expected to experience a great amount of vibration, the substrate material must be able to withstand a great amount of compression during installation of the rivet nut and after fastening, the rivet nut must have sufficient hardness to withstand such compression and fastening, and the fastener (screw or bolt) must be able to withstand the amount of torque required to achieve the optimal fastening.

In many typical fastening applications, the length of the bushing sleeve is the thickness of the substrate plus the thickness of the head of the rivet nut, so that proper axial-pull upset results in the visible edge of the sleeve being seen flush with (or just below) the trailing end of the rivet nut. However, for intentional over-upset installations for desired firmer clamping of an applicable substrate, the bushing sleeve length may be reduced by a relatively short distance (often about an additional 1 millimeter) to ensure a higher rivet nut substrate surface upset clamp load. Moreover, with respect to some fastening joint applications involving softer plastic substrate material, the surface clamp load may need to be reduced rather than increased. In this situation, the bushing sleeve will be increased in length to the desired rivet nut upset length required for the substrate material being used. The bushing sleeve under these circumstances will prevent undesired over-upset.

The amount of threading defining the mating chamber of the insertion portion of the rivet nut has been increased from the minimum required by Industrial Fasteners Institute standards across all various thread fastener sizes, both metric and inch. The mating chamber of the improved rivet nut includes an additional four (4) to six (6) threads per inch. The additional threading increases thread strength and reduces thread deformation as well as thread pull/strip-out when high drive torque is applied. The axial pull tool can even be set for an over-upset pull strength without producing thread deformation/destruction to the rivet nut. (For example, when the application requires very strong gripping of the substrate, a sleeve having a slightly shorter depth can be used to allow the installation tool to provide a longer back-stroke axial pull during installation/upset, resulting in a rivet nut with a wider bulb and pinching/clamping the substrate more firmly with the underside of the head.) The additional thread strength ensures a secure, properly set fastening joint without the problems of thread pull/strip out and thread distortion/deformation, especially when using the bushing sleeve even installed under over-upset conditions. In thread-strength tests of a 10.9 grade screw mated into a properly installed 10.9 grade rivet nut (with a bushing sleeve of the correct length), and applying torque applicable for 12.9 grade materials (so-called over-torquing conditions), the head of the screw will break (detach from the threaded shank) without torquing out and/or breaking loose in the rivet nut fastening joint substrate.

Another improvement is the intersection between the serrated underside of the rivet nut head and the knurling of the outer wall of the rivet nut counterbore, which intersection region will be called the under-head juncture. The length of the knurling ending at the under-head juncture typically (preferably) will not exceed the thickness of the substrate; the knurling is optimized to provide increased contact with the wall of the hole when the rivet nut is upset by reverse axial pulling; and the knurling also participates in the smoothing of any sharp edges and burs of the substrate hole, and in truing up any out-of-round hole. The knurling and under-head juncture essentially rework the substrate installation hole during upsetting. The under-head juncture also provides a press fit or interference fit into the substrate hole of about 0.003 inch to about 0.006 inch. Most importantly, the rivet nut under-head juncture provides a mechanical lock, and completely and firmly fills the substrate hole with the rivet nut, clamping the substrate more firmly between the serrations under the head of the rivet nut and the knurling within the hole, and the knurling contacting the inner surface of the substrate that surrounds the hole. The current conventional rivet nut product in the industry does not completely fill the substrate hole or correct the other aforementioned defects. This is because the typical rivet nut substrate installation hole is larger than the outer diameter of the rivet nut. Because of the interactions of the under-head juncture's angulation design, the hole edge strength increases about 30%. The tensile strength increases about 48%, and the rivet-hole interface area increases about 26%. The under-head angulation press fit into the substrate hole will also prevent seepage of most fluids. Completely and firmly filling the substrate hole also eliminates fatigue failure loading of the fastening joint. This improvement provides a press fit or interference fit stabilizing the interface between the substrate hole and the anchored rivet nut, and provides a mechanical locking joint.

The design of the rivet nut at the bottom of the threaded insertion end allows for a plug (epoxy, or steel plug) to be locked in the end if required or desired for waterproof or moisture resistant uses.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

In one general embodiment, the invention disclosed herein comprises (includes) an apparatus providing mating alignment between internal threading of a rivet nut and the external threading of the mandrel of an unclaimed rivet nut installation tool before anchoring the rivet nut in a hole in a substrate. Alternatively, the invention includes an apparatus providing mating alignment between internal threading of a rivet nut and the external threading of an unclaimed threaded fastener after anchoring in the substrate hole. The apparatus comprises:

(a) a rivet nut (1) comprises an insertion portion having an external diameter sized for close insertion into the substrate hole (with the outer walls touching or in close proximity to the substrate) and having an internal diameter having internal threading (17) defining an essentially cylindrical mating chamber (18), and a trailing portion comprises a trailing end defining an essentially circular opening having a circumference defined by an inner wall (14) defining an essentially cylindrical cavity leading to the mating chamber, the mating chamber having an internal diameter smaller than that of the opening and cavity; and (b) a bushing sleeve (20) having a maximum outer diameter sized for snug insertion and retention in the cavity and having an inner diameter sized to guide the external threading of the installation tool's mandrel or the external threading of the fastener into optimally aligned rotational mating with the internal threading of the mating chamber.

The internal diameter of the internally threaded insertion portion of the rivet nut is generally defined by the ridge of the threading (17), forming the boundaries of the mating chamber.

The inner diameter defined by the sleeve's inner wall (21) is typically equal to or larger than the diameter of the internal threading defining the mating chamber of the insertion portion. The sleeve may have an inner diameter in the range of between about 0.0015 to about 0.0025 inch larger than the diameter of the internal threading defining the mating chamber.

The sleeve may further include a first end having annular beveling (25) reducing the outer diameter of that end to smaller than the maximum outer diameter of the sleeve and facilitating snug insertion into the cavity. The sleeve may further include a first annular band section (26) adjacent the first end beveling, and having an outer diameter larger than that of the first end beveling but smaller than the maximum outer diameter of the sleeve, and facilitating snug insertion of the sleeve into the cavity. The sleeve may further include a second end having annular beveling reducing the outer diameter of that end to smaller than the maximum outer diameter of the sleeve and enabling either the first end or the second end to facilitate snug insertion into the cavity. The sleeve may further include a second annular band section adjacent the second end beveling and having an outer diameter larger than that of the second end beveling but smaller than the maximum outer diameter of the sleeve, and enabling either the first end or the second end to facilitate snug insertion into the cavity.

In one preferred embodiment, the cavity comprises a counterbore cavity (1) ending in an annular seating ledge (16); and the sleeve comprises a hollow cylinder having a seating end and a trailing end and configured for snug seating within the counterbore cavity with the seating end adjacent the annular seating ledge. The sleeve preferably has an inner diameter slightly larger than the inner diameter of the annular seating ledge; the combination and coordination of both inner diameters preferably should function to essentially funnel the threaded tip of the mating member into optimal mating alignment with the threading of the mating chamber. The sleeve inner diameter preferably has an inner diameter providing only enough leeway for the incoming mating member to align with the mating chamber.

The inner wall defining the counterbore cavity may have an inner diameter converging from the opening to the annular seating ledge. The convergence may be continuous from the head opening of the cavity to the seating ledge. Alternatively, the counterbore wall may be essentially parallel from the head opening to a point before reaching the seating ledge, at which point it either converges continuously to the seating ledge or it commences a step-down convergence before commencing its continuous convergence to the seating ledge. The convergence essentially funnels the bushing sleeve into snug seating in the counterbore cavity, and facilitates the reverse axial pulling of the rivet nut to accomplish proper upsetting (bulb formation).

The sleeve should have a length enabling its trailing edge to be substantially flush with (or slightly below) the surface of the counterbore cavity opening if the rivet nut has been properly installed. This will provide a visual check for proper installation of the rivet nut.

The annular ledge may have a surface sloping toward the internal threading defining the mating chamber. This may facilitate the funneling of the threaded end of an incoming fastener (or the installation tool mandrel) toward mating alignment with the threads of the mating chamber. Preferably the annular ledge has a surface sloping at an angle in the range of between about 20 degrees to about 40 degrees. More preferably, the angle is in the range of between about 25 degrees and about 35 degrees. More preferably, the angle is about 30 degrees. Thread size and characteristics may often determine the ideal angulation.

The insertion portion will typically include a terminal opening (be "open-ended" at the insertion end). However, for uses requiring or desiring waterproofing or moisture resistance, the apparatus may further include a means of closing the terminal opening, selected from members of the group consisting of water impermeable adhesives and other substances durably blocking the insertion portion, and mixtures and combinations thereof. The rivet nut may have a water impermeable adhesive like Poly-Amid, 2 Part Epoxy, and specially formulated adhesives obstructing its usually-open insertion end.

The rivet nut trailing portion may further comprise, opposite the counterbore cavity, an outer surface including knurling (15) parallel to the longitudinal axis of the counterbore cavity for contacting the edge of the substrate hole for resisting rotation of the rivet nut anchored in the substrate hole. For anchoring the rivet nut to the substrate hole and substrate, while the rivet nut insertion portion is mated with the installation tool before anchoring of the rivet nut in the substrate hole, the installation tool applies reverse axial pulling to the insertion portion causing such anchoring by collapsing of the trailing portion including knurling, resulting in formation of an annular bulb (19) outstanding from the main body of the rivet nut (except the head), crimping the substrate between the head (11) and the bulb. The knurling should have a length and numerosity also optimizing rotation-resisting contact between the knurling and the sidewall of the substrate hole, in addition to rotation-resisting contact between the knurling of the bulb and the underside of the substrate.

The rivet nut trailing end of the trailing portion may further include an annular head flange (11) surrounding the opening and preventing the rivet nut from passing through the substrate hole. It may further include, on the underside of the head, radiating serrations (13) for contacting the exterior margins of the substrate defining the hole for resisting rotation of the rivet nut anchored in the substrate hole.

Serrations (13) on the underside of the head of a rivet nut provide better surface contact on the exterior side of the substrate. They work in conjunction with the parallel knurls of the outer surface of the trailing portion of the rivet nut, to reduce direct torque-to-turn spin out rotation of the rivet nut within the substrate hole. Serrations and knurling will work against (counteract) screw set drive torque sequencing. These features enable the improved rivet nut's torque-to-turn drive torque values to exceed the DC Electric tool drive torque parameters set for the mating screw thread size and grade and fastener for a secure fastening joint. The rivet nut capabilities exceed the threaded screw or bolt thread sizes drive torque-to-turn values under fastener joint load of the screw or bolt thread sizes, and material grade (8.8 through 10.9), and prevent the rivet nut from breaking loose in the substrate. The screw or bolt will self-destruct and be the failure before the rivet nut breaks loose in the substrate. The shank knurling and under-head serrations provide additional surface contact. Moreover, the length and numerosity and orientation (radiating and parallel) of the improved serrations and knurling resist the formation of stress risers on the substrate surface area.

One specific embodiment of the apparatus providing mating alignment between internal threading of a rivet nut and the external threading of the mandrel of an unclaimed rivet nut installation tool before anchoring the rivet nut in a hole in a substrate (or the external threading of an unclaimed threaded fastener after anchoring in the substrate hole), the apparatus comprises:

(a) a rivet nut comprises an insertion portion having an external diameter sized for close insertion into the substrate hole and having an internal diameter having internal threading defining an essentially cylindrical mating chamber, and a trailing portion comprises a trailing end having an essentially circular opening having a circumference defined by an inner wall defining an essentially cylindrical counterbore cavity having an inner diameter converging from the counterbore cavity opening to an annular seating ledge terminating the counterbore cavity and leading to the mating chamber, the mating chamber having an internal diameter smaller than that of the opening and counterbore cavity; and (b) a hollow cylindrical bushing sleeve comprises a trailing edge, and a seating end for snug seating within the counterbore cavity with the seating end adjacent the annular seating ledge, the sleeve having a maximum outer diameter sized for snug retention in the counterbore cavity and having an inner diameter slightly larger than the internal diameter of the threading defining the mating chamber to guide the external threading of the installation tool's mandrel or the external threading of the fastener into optimally aligned rotational mating with the internal threading of the mating chamber, the sleeve also having a length enabling its trailing edge to be substantially flush with the counterbore cavity opening if the rivet nut has been properly installed.

The insertion portion of the rivet nut may further include a terminal opening defined by the leading edge (12). For applications requiring or desiring waterproofing or moisture resistance, the apparatus may further include a means of closing the terminal opening, selected from members of the group consisting of water impermeable adhesives and substances durably blocking the insertion portion, and mixtures and combinations thereof. For example, the water impermeable adhesive may be Polyamide or 2 Part Epoxy, and specially formulated sealants.

As with earlier described embodiments, the seating end may further include annular beveling (25) reducing the outer diameter of the seating end to smaller than the maximum outer diameter of the sleeve and facilitating snug insertion in the counterbore cavity. The sleeve may further include a first annular band section (26) adjacent the seating end beveling and having an outer diameter larger than that of the seating end beveling but smaller than the maximum outer diameter of the sleeve and facilitating snug insertion and retention of the sleeve in the counterbore cavity. The trailing end may further include annular beveling (25) reducing the outer diameter of the trailing end to smaller than the maximum outer diameter of the sleeve and enabling either the seating end or the trailing end to facilitate snug insertion in the counterbore cavity. The sleeve may further include a second annular band section (26) adjacent the trailing end beveling (25) and having an outer diameter larger than that of the trailing end beveling but smaller than the maximum outer diameter of the sleeve and enabling either the seating end or the trailing end to facilitate snug insertion and retention in the counterbore cavity.

The rivet nut trailing portion may further comprise, opposite the counterbore cavity, an outer surface including knurling parallel to the longitudinal axis of the counterbore cavity for contacting the edge of the substrate hole for resisting rotation of the rivet nut anchored in the substrate hole. While the rivet nut insertion portion is mated with the installation tool before anchoring of the rivet nut in the substrate hole, the installation tool applies reverse axial pulling to the insertion portion causing such anchoring by collapsing of the trailing portion including knurling, resulting in formation of an outstanding annular bulb crimping the substrate between the head and the bulb. The knurling having a length and numerosity also optimizing rotation-resisting contact between the knurling and the sidewall of the substrate hole, in addition to rotation-resisting contact between the knurling and the bulb.

The rivet nut trailing end of the trailing portion may further include an annular head flange surrounding the opening and preventing the rivet nut from passing through the substrate hole. Additionally, on the underside of the head, there may be radiating serrations (13) for contacting the exterior margins of the substrate defining the hole for resisting rotation of the Rivet nut anchored in the substrate hole.

The seating ledge (16) has an outer diameter defined by the bottom of the counterbore cavity wall (14) and an inner diameter defined by the free edge of the ledge. In another embodiment, the seating ledge has an inner diameter defined by the inner diameter of the uppermost edge of the threading. In another embodiment, that free edge of the seating ledge may lead into the beginning of that threading.

Besides the apparatus described herein, the invention disclosed herein includes a method of anchoring a rivet nut to a substrate. One particular embodiment includes a method comprising the steps of:

(a) Seating the bushing sleeve in cavity of the trailing portion of the rivet nut;

(b) Partially screwing the rivet nut onto the installation tool, essentially rotatingly mating the external threads of the installation tool (typically called the mandrel) with the internal threads of the mating chamber of the insertion portion of the rivet nut;

(c) Inserting the tool-mated rivet nut into a hole in the substrate (panel, for instance), until the head of the rivet nut contacts the outer surface of the substrate;

(d) Triggering the installation tool to complete the rotational mating of the rivet nut and the mandrel;

(e) Triggering the installation to exert reverse pulling, "upsetting" the rivet nut by collapsing the wall portion having knurling until the wall crimps and forms an annular bulb outstanding from the rivet nut about the same amount as the head of the rivet nut, and pinching the substrate between the underside of the head and the upper side of the bulb; and (f) Triggering the reverse rotation of the mandrel to release the installation tool from the rivet nut anchored in the substrate.

The method may further include the step of, after a complete axial pull tool sequence as stated in the immediately preceding paragraph has been accomplished, the operator operating the axial pull tool is able to inspect the fastening joint for proper joint integrity upset. The bushing sleeve after upset will sit slightly below the surface of the head (or flush with the head surface). If the bushing sleeve is visually seen having only traveled a short distance leaving (for example) a void between the top of the rivet nut head to about one-third (⅓) down the counterbore exposed, and visually seeing the bushing sleeve not in the proper axial pull upset location after upset, this determines an out of control of condition and a not secure fastening joint. The bushing sleeve not in its specified location after upset indicates to the operator using the axial pull tool that the operator needs to correct the out-of-control tolerance fastening joint condition.

The method of using the anchored rivet nut may include the steps of:
 (a) inserting the tip of an externally threaded fastener into the lumen of the bushing sleeve seated within the cavity of the trailing portion of the rivet nut; and
 (b) exerting pressure while rotating the fastener in the fastening direction, sufficient to allow the sleeve to essentially funnel the tip into rotational mating contact with the threads defining the mating chamber.

The method may further include the step of the rivet nut bushing sleeve functioning as a location guide for the male threaded fastener to engage the rivet nut threads for thread-to-thread proper alignment upon thread rotation engagement. The bushing sleeve is an alignment device that will reduce cross thread conditions when using the mating threaded screw and having the screw driving tool rotating the threaded screw before thread engagement into the threads of the rivet nut.

Although the present disclosure and its advantages have been described in detail, it should be understood that various changes, substitutions and alterations can be made herein without departing from the spirit and scope of the design as defined by the appended claims. The scope of the present application is not intended to be limited to the particular embodiments of the process, machine, manufacture, composition of matter, means, methods and/or steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The scope of the present application is not intended to be limited to the particular embodiments of the process, machine, manufacture, composition of matter, means, methods and steps described in the specification.

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention.

While the forms of apparatus herein described constitute preferred embodiments of the invention, it is to be understood that the invention is not limited to these precise forms of apparatus, and that changes may be made therein without departing from the scope and spirit of the invention as defined in the appended claims.

Those skilled in the art will recognize improvements and modification to the preferred embodiments of the present disclosure. All such improvements and modifications are considered within the scope of the concepts disclosed herein and the claims that follow.

The invention claimed is:

1. An apparatus providing mating alignment between internal threading of a rivet nut and the external threading of the mandrel of an unclaimed rivet nut installation tool before anchoring the rivet nut in a hole in a substrate having a thickness, or the external threading of an unclaimed threaded fastener after anchoring in the substrate hole (collectively the "mating member"), the apparatus comprising:
 (a) a rivet nut comprising an insertion portion having an external diameter sized for close insertion into the substrate hole and having an internal diameter having internal threading defining an essentially cylindrical mating chamber, and a trailing portion comprising a trailing end having an essentially circular opening having a circumference defined by an internal wall defining an essentially cylindrical cavity spanning at least the substrate thickness and leading to said mating chamber, the mating chamber having an internal diameter smaller than that of said opening and cavity; and
 (b) a bushing sleeve having a maximum outer diameter sized for snug insertion and retention within said cavity and having an inner diameter sized to guide the external threading of the mating member into optimally aligned rotational mating with said internal threading of the mating chamber.

2. An apparatus described in claim 1 hereinabove, wherein the inner diameter of the sleeve is larger than the diameter of the internal threading defining the mating chamber of the insertion portion.

3. An apparatus described in claim 1 hereinabove, the sleeve having an inner diameter in the range of between about 0.0015 inch to about 0.0025 inch larger than the outer diameter of the mating member.

4. An apparatus described in claim 1 hereinabove, the sleeve further comprising a first end having annular beveling reducing the outer diameter of that end to smaller than the maximum outer diameter of the sleeve and facilitating snug insertion into the cavity.

5. An apparatus described in claim 4 hereinabove, the sleeve further comprising a first annular band section adjacent the first end beveling and having an outer diameter larger than that of the first end beveling but smaller than the maximum outer diameter of the sleeve, and facilitating snug insertion of the sleeve into the cavity.

6. An apparatus described in claim 5 hereinabove, the sleeve further comprising a second end having annular beveling reducing the outer diameter of that end to smaller than the maximum outer diameter of the sleeve and enabling either the first end or the second end to facilitate snug insertion into the cavity.

7. An apparatus described in claim 6 hereinabove, the sleeve further comprising a second annular band section adjacent the second end beveling and having an outer diameter larger than that of the second end beveling but smaller than the maximum outer diameter of the sleeve, and enabling either the first end or the second end to facilitate snug insertion into the cavity.

8. An apparatus described in claim 1 hereinabove, wherein:
 (a) said cavity comprises a counterbore cavity ending in an annular seating ledge; and (b) said sleeve comprises a hollow cylinder having a seating end and a trailing end having a trailing edge, the sleeve configured for snug seating within the counterbore cavity with the seating end adjacent the annular seating ledge.

9. An apparatus described in claim 8 hereinabove, the sleeve having an inner diameter slightly larger than the internal diameter of the annular seating ledge.

10. An apparatus described in claim 8 hereinabove, the sleeve having an inner diameter and the annular seating ledge having an internal diameter providing sufficient leeway to guide the external threading of the mating member into optimally aligned rotational mating with the internal threading of the mating chamber.

11. An apparatus described in claim 8 hereinabove, said internal wall defining the counterbore cavity having an internal diameter converging from the opening to the annular seating ledge.

12. An apparatus described in claim 8 hereinabove, the sleeve having a length enabling its trailing edge to be situated within the counterbore cavity for providing visual confirmation that the rivet nut has been properly installed.

13. An apparatus described in claim 8 hereinabove, said annular ledge defining a surface sloping toward the internal threading defining the mating chamber.

14. An apparatus described in claim 13 hereinabove, said annular ledge defining a surface sloping at an angle in the range of between about 20 degrees to about 40 degrees.

15. An apparatus described in claim 14 hereinabove, said annular ledge defining a surface sloping at an angle of about 30 degrees.

16. An apparatus described in claim 1 hereinabove, said insertion portion further comprising a terminal opening, said apparatus further comprising a means of closing said terminal opening, selected from members of the group consisting of water impermeable adhesives and other substances durably blocking the insertion portion, and mixtures and combinations thereof.

17. An apparatus described in claim 1 hereinabove, said rivet nut trailing portion further comprising, opposite the counterbore cavity, an outer surface including knurling parallel to the longitudinal axis of the counterbore cavity for contacting the edge of the substrate hole for resisting rotation of the rivet nut anchored in the substrate hole, wherein, while the rivet nut insertion portion is mated with the installation tool before anchoring of the rivet nut in the substrate hole, the installation tool applies reverse axial pulling to the insertion portion causing such anchoring by collapsing of the trailing portion including knurling, resulting in formation of an outstanding annular bulb crimping the substrate between the head and the knurling of the bulb.

18. An apparatus described in claim 17 hereinabove, said knurling having a length and numerosity also optimizing rotation-resisting contact between the knurling and the sidewall of the substrate hole.

19. An apparatus described in claim 1 hereinabove, said rivet nut trailing end of the trailing portion further comprising an annular head flange surrounding the opening and preventing the rivet nut from passing through the substrate hole, and further comprising, on the underside of the head, under-head juncture angulation and radiating serrations for contacting the exterior margins of the substrate defining the hole for resisting rotation of the rivet nut anchored in the substrate hole.

20. An apparatus providing mating alignment between internal threading of a rivet nut and the external threading of the mandrel of an unclaimed rivet nut installation tool before anchoring the rivet nut in a hole in a substrate, or the external threading of an unclaimed threaded fastener after anchoring in the substrate hole (collectively the "mating member"), the apparatus comprising:
(a) a rivet nut comprising an insertion portion having an external diameter sized for close insertion into the substrate hole and having an internal diameter having internal threading defining an essentially cylindrical mating chamber, and a trailing portion comprising a trailing end having an essentially circular opening having a circumference defined by an internal wall defining an essentially cylindrical counterbore cavity having an internal diameter converging from the counterbore cavity opening to an annular seating ledge terminating the counterbore cavity and leading to said mating chamber, the mating chamber having an internal diameter smaller than that of said opening and counterbore cavity; and
(b) a hollow cylindrical bushing sleeve comprising a trailing end having a trailing edge, and a seating end for snug seating within the counterbore cavity with the seating end adjacent the annular seating ledge, said sleeve having a maximum outer diameter sized for snug retention in the counterbore cavity and having an inner diameter slightly larger than the internal diameter of the threading defining the mating chamber to guide the external threading of the installation tool's mandrel or the external threading of the fastener into optimally aligned rotational mating with said internal threading of the mating chamber, the sleeve also having a length enabling its trailing edge to be substantially flush with the counterbore cavity opening for providing visual confirmation that the rivet nut has been properly installed.

21. An apparatus described in claim 20 hereinabove, said sleeve having an inner diameter in the range of between about 0.0015 inch to about 0.0025 inch larger than the outer diameter of the mating member.

22. An apparatus described in claim 20 hereinabove, said sleeve having an inner diameter slightly larger than the internal diameter of the annular seating ledge.

23. An apparatus described in claim 20 hereinabove, the sleeve having an inner diameter and the annular seating ledge having an internal diameter providing sufficient leeway to guide the external threading of the mating member into optimally aligned rotational mating with the internal threading of the mating chamber.

24. An apparatus described in claim 20 hereinabove, said annular ledge defining a surface sloping toward the internal threading of the mating chamber.

25. An apparatus described in claim 24 hereinabove, said annular ledge defining a surface sloping at an angle in the range of between about 20 degrees to about 40 degrees.

26. An apparatus described in claim 20 hereinabove, said insertion portion further comprising a terminal opening, said apparatus further comprising a means of closing said terminal opening, selected from members of the group consisting of water impermeable adhesives and substances durably blocking the insertion portion, and mixtures and combinations thereof.

27. An apparatus described in claim 20 hereinabove, the seating end further comprising annular beveling reducing the outer diameter of the seating end to smaller than the maximum outer diameter of the sleeve and facilitating snug insertion in the counterbore cavity.

28. An apparatus described in claim 27 hereinabove, the sleeve further comprising a first annular band section adjacent the seating end beveling and having an outer diameter larger than that of the seating end beveling but smaller than the maximum outer diameter of the sleeve, and facilitating snug insertion and retention of the sleeve in the counterbore cavity.

29. An apparatus described in claim 20 hereinabove, said rivet nut trailing portion further comprising, opposite the counterbore cavity, an outer surface including knurling parallel to the longitudinal axis of the counterbore cavity for contacting the edge of the substrate hole for resisting rotation of the rivet nut anchored in the substrate hole, wherein, while the rivet nut insertion portion is mated with the installation tool before anchoring of the rivet nut in the substrate hole, the installation tool applies reverse axial pulling to the insertion portion causing such anchoring by collapsing of the trailing portion including knurling, resulting in formation of an outstanding annular bulb crimping the substrate between the head and the knurling of the bulb.

30. An apparatus described in claim 20 hereinabove, said rivet nut trailing end of the trailing portion further comprising an annular head flange surrounding the opening and preventing the rivet nut from passing through the substrate hole, and further comprising, on the underside of the head, under-head juncture angulation and radiating serrations for contacting the exterior margins of the substrate defining the hole for resisting rotation of the rivet nut anchored in the substrate hole.

\* \* \* \* \*